US008031492B2

United States Patent
Lin et al.

(10) Patent No.: US 8,031,492 B2
(45) Date of Patent: Oct. 4, 2011

(54) PWM CONTROLLER FOR COMPENSATING A MAXIMUM OUTPUT POWER OF A POWER CONVERTER

(75) Inventors: Chien Yuan Lin, Pan-Chiao (TW); Tin-Wei Chen, Taipei (TW)

(73) Assignee: System General Corp., Taipei (TW)

( * ) Notice: Subject to any disclaimer, the term of this patent is extended or adjusted under 35 U.S.C. 154(b) by 681 days.

(21) Appl. No.: 11/960,695

(22) Filed: Dec. 19, 2007

(65) Prior Publication Data

US 2008/0310193 A1  Dec. 18, 2008

Related U.S. Application Data

(60) Provisional application No. 60/944,096, filed on Jun. 14, 2007.

(51) Int. Cl.
 *H02M 3/335* (2006.01)
(52) U.S. Cl. .................................. 363/21.18
(58) Field of Classification Search .............. 363/21.18, 363/22, 23, 21.1, 21.11
 See application file for complete search history.

(56) References Cited

U.S. PATENT DOCUMENTS

| | | | |
|---|---|---|---|
| 6,597,159 B2 * | 7/2003 | Yang | 323/283 |
| 6,611,439 B1 * | 8/2003 | Yang et al. | 363/41 |
| 6,906,934 B2 * | 6/2005 | Yang et al. | 363/49 |
| 6,914,794 B2 * | 7/2005 | Watanabe et al. | 363/132 |
| 6,975,177 B2 * | 12/2005 | Varis et al. | 332/106 |
| 7,221,121 B2 * | 5/2007 | Skaug et al. | 318/807 |
| 7,362,593 B2 * | 4/2008 | Yang et al. | 363/21.16 |
| 7,439,716 B2 * | 10/2008 | Gay | 323/224 |
| 7,592,790 B2 * | 9/2009 | Yang | 323/277 |
| 7,602,160 B2 * | 10/2009 | Yang et al. | 323/271 |
| 7,656,685 B2 * | 2/2010 | Yang et al. | 363/21.01 |
| 2009/0015225 A1 * | 1/2009 | Turchi et al. | 323/283 |

* cited by examiner

*Primary Examiner* — Matthew Nguyen
*Assistant Examiner* — Yemane Mehari
(74) *Attorney, Agent, or Firm* — Chun-Ming Shih

(57) ABSTRACT

A PWM controller having an oscillator, a control circuit and a two-level limiter is provided. The oscillator generates a pulse signal. The control circuit couples to the oscillator for generating a PWM signal in response to the pulse signal, wherein the PWM signal controls a power switch. The two-level limiter couples to the control circuit for generating a two-level limit signal in response to an on-time of the PWM signal, wherein the two-level limit signal is formed by a first-level signal and a second-level signal during a switching period of the PWM signal, and the first-level signal is used to limit the maximum output power of the power converter under a high-line input voltage with a heavy-load condition, and the second-level signal is used to limit the maximum output power of the power converter under a low-line input voltage with the heavy-load condition.

7 Claims, 3 Drawing Sheets

PWM CONTROLLER FOR COMPENSATING A MAXIMUM OUTPUT POWER OF A POWER CONVERTER

CROSS-REFERENCE

This application claims priority from U.S. Provisional Patent Application No. 60/944,096, filed on Jun. 14, 2007.

FIELD OF THE INVENTION

The present invention relates to a power converter, and more particularly, to a PWM controller having a two-level limiter used for compensating a maximum output power of a power converter.

BACKGROUND OF THE INVENTION

Power converters are generally used to power many of electronic devices. The pulse-width modulation (PWM) technique is a conventional technology used in a power converter to control and regulate the output power. Various protection functions are built-in in the power converter to protect the power converter from permanent damage. The function of compensating maximum output power is commonly used for overload and short-circuit protections.

FIG. 1 shows a circuit diagram of a traditional power converter used in prior art. The power converter comprises a power transformer $T_1$ having a primary winding $N_P$ and a secondary winding $N_S$. The power transformer $T_1$ is to provide galvanic isolation between AC line input and an output of the power converter for safety. The primary winding $N_P$ is supplied with an input voltage $V_{IN}$ of the power converter. In order to regulate an output voltage $V_O$ of the power converter, a PWM controller coupled in series with the primary winding $N_P$ of the power transformer $T_1$ generates a PWM signal $V_{PWM}$ in response to a feedback signal $V_{FB}$. The PWM controller comprises an oscillator 10, a first comparator 31, a second comparator 32, a logic circuit 33, and a flip-flop 20. The PWM signal $V_{PWM}$ controls a power switch $Q_1$ to switch the power transformer $T_1$. A sense resistor $R_S$ is connected in series with the power switch $Q_1$ to determine the maximum output power of the power converter. The sense resistor $R_S$ turns the switching current of the transformer $T_1$ to a current signal $V_{CS}$. The current signal $V_{CS}$ is coupled to the PWM controller. If the current signal $V_{CS}$ is greater than a maximum threshold $V_M$ through the first comparator 31, the PWM controller is coupled to disable the PWM signal $V_{PWM}$, and it also restricts the maximum output power of the power converter.

FIG. 2 shows the signal waveforms of the PWM signal and the current signal of the power converter in FIG. 1. As the PWM signal $V_{PWM}$ becomes logic-high, a primary-side switching current $I_P$ will be generated accordingly. A peak value $I_{P1}$ of the primary-side switching current $I_P$ can be given by, $$I_{P1} = \frac{V_{IN}}{L_P} \times T_{ON} \qquad (1)$$

The maximum output power $P_O$ can be expressed by, $$P_O = \frac{L_P}{2 \times T_S} \times I_{P1}^2 = \frac{V_{IN}^2 \times T_{ON}^2}{2 \times L_P \times T_S} \qquad (2)$$

In Equations (1) and (2), $L_P$ is the inductance of the primary winding $N_P$ of the transformer $T_1$, and $T_{ON}$ is an on-time of the PWM signal $V_{PWM}$ while the power switch $Q_1$ is switched on, and $T_S$ is the switching period of the PWM signal $V_{PWM}$.

From Equation (2), we find that the output power varies as the input voltage $V_{IN}$ varies. The input voltage $V_{IN}$ ranges between $90V_{AC}$ and $264V_{AC}$ when the safety regulations are taken into consideration, and wherein the power limit in high-line input voltage is many times higher than the power limit in low-line input voltage. There is a delay time $T_D$ from the moment the voltage in current signal $V_{CS}$ is higher than the maximum threshold $V_M$ to the moment the PWM signal $V_{PWM}$ is actually turned off. The maximum output power is also affected by the delay time $T_D$ of the PWM controller. In the period of the delay time $T_D$, the power switch $Q_1$ is still turned on, and it keeps on-status for delivering the output power. Therefore, the actual on-time of the PWM signal $V_{PWM}$ is equal to $T_{ON}+T_D$, and the actual maximum output power $P_O$ becomes as follows:

$$P_O = \frac{V_{IN}^2 \times (T_{ON} + T_D)^2}{2 \times L_P \times T_S} \qquad (3)$$

Although the delay time $T_D$ is short, generally within the range of 200 nsec~350 nsec, the higher operating frequency and smaller switching period $T_S$, the more influential impact is caused by the delay time $T_D$. Therefore, the input voltage $V_{IN}$ should be compensated properly, such that the input voltage $V_{IN}$ does not affect the maximum output power.

SUMMARY OF THE INVENTION

An objective of the present invention is to provide a PWM controller for compensating the maximum output power of a power converter. A two-level limiter of the PWM controller can compensate the difference caused by the input voltage and the delay time, an identical output power limit for the low-line input and high-line input voltage can be achieved.

A PWM controller is developed for compensating a maximum output power of a power converter. It comprises an oscillator, a control circuit, and a two-level limiter. The oscillator generates a pulse signal. The control circuit is coupled to the oscillator for generating a PWM signal in response to the pulse signal, wherein the PWM signal controls a power switch. The two-level limiter is coupled to the control circuit for generating a two-level limit signal in response to an on-time of the PWM signal, wherein the two-level limit signal is formed by a first-level signal and a second-level signal during a switching period of the PWM signal, and the first-level signal is used to limit the maximum output power of the power converter under a high-line input voltage with a heavy-load condition, and the second-level signal is used to limit the maximum output power of the power converter under a low-line input voltage with the heavy-load condition.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
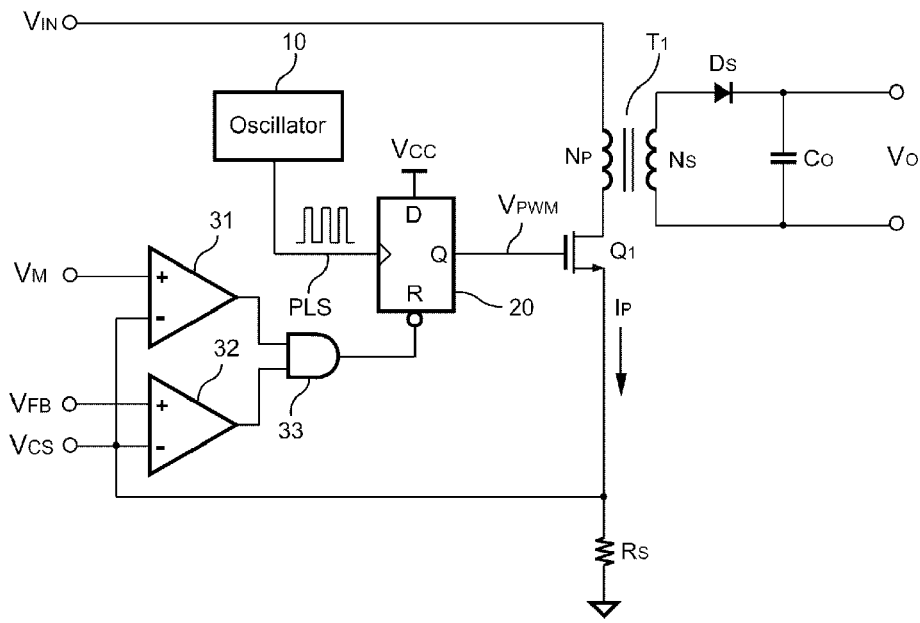
FIG. 1 shows a circuit diagram of a traditional power converter used in prior art.
Figure 2:
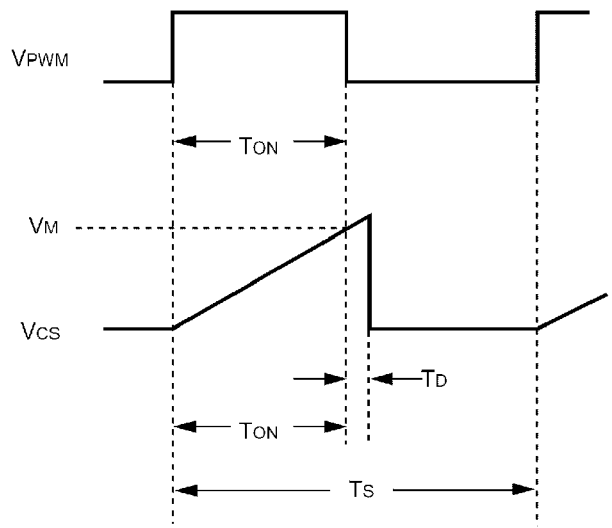
FIG. 2 shows the signal waveforms of the PWM signal and the current signal of the traditional power converter.
Figure 3:
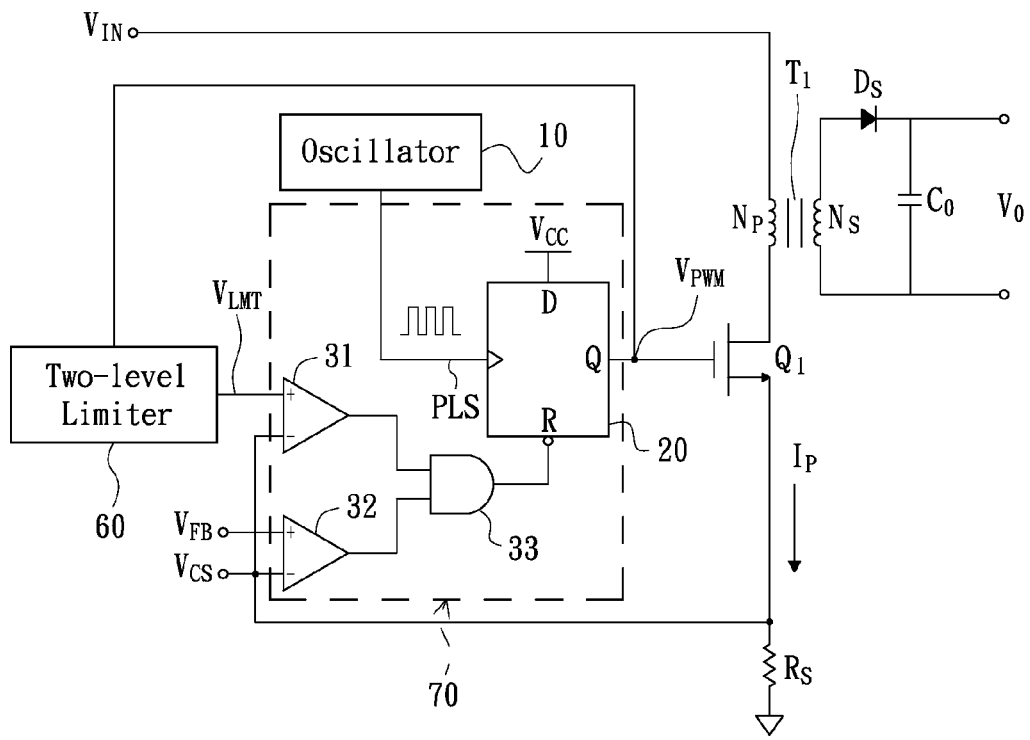
FIG. 3 shows a power converter having a PWM controller in accordance with the present invention.

FIG. 3 is a power converter having a PWM controller in accordance with an embodiment of the present invention. The power converter comprises a power transformer $T_1$ and the PWM controller. The power transformer $T_1$ has a primary winding $N_P$ and a secondary winding $N_S$. The power transformer $T_1$ transfers the stored energy from the primary winding $N_P$ to the secondary winding $N_S$. The primary winding $N_P$ is supplied with an input voltage $V_{IN}$ of the power converter. The PWM controller comprises an oscillator 10, a first comparator 31, a second comparator 32, a logic circuit 33, and a flip-flop 20. The PWM signal $V_{PWM}$ controls a power switch $Q_1$ to switch the power transformer $T_1$. A sense resistor $R_S$ is connected in series with the power switch $Q_1$ to determine the maximum output power of the power converter. The sense resistor $R_S$ converts the switching current $I_P$ of the transformer $T_1$ to a current signal $V_{CS}$, wherein the current signal $V_{CS}$ is coupled to the PWM controller.

In one embodiment, the PWM controller comprises an oscillator 10, a two-level limiter 60 and a control circuit. The oscillator 10 generates a pulse signal PLS coupled to the control circuit 70. The control circuit 70 comprises a first comparator 31, a second comparator 32, a logic circuit 33, and a flip-flop 20. The control circuit 70 is coupled to the oscillator 10 for generating a PWM signal $V_{PWM}$ in response to the pulse signal PLS, and the PWM signal $V_{PWM}$ controls the power switch $Q_1$. The two-level limiter 60 is coupled to the control circuit 70 for generating a two-level limit signal $V_{LMT}$ in response to an on-time of the PWM signal $V_{PWM}$. The two-level limit signal $V_{LMT}$ is used to limit the maximum output power of the power converter to compensate the difference caused by the input voltage and the delay time.

The two-level limiter 60 is coupled to a positive input terminal of the first comparator 31 of the control circuit 70 for generating the two-level limit signal $V_{LMT}$. A negative input terminal of the first comparator 31 receives the current signal $V_{CS}$. The output of the comparators 31 and 32 are coupled to an input of the logic circuit 33. An output of the logic circuit 33 is coupled to a reset terminal R of the flip-flop 20. Furthermore, the pulse signal PLS is coupled to a clock terminal CK of the flip-flop 20 from the oscillator 10. The flip-flop 20 of the control circuit 70 is coupled to disable the PWM signal $V_{PWM}$ when the current signal $V_{CS}$ is greater than the two-level limit signal $V_{LMT}$ through the first comparator 31. The two-level limit signal $V_{LMT}$ is formed by a first-level signal and a second-level signal during a switching period $T_S$ of the PWM signal $V_{PWM}$. The first-level signal is used to limit the maximum output power of the power converter under a high-line input voltage with a heavy load, and the second-level signal is used to limit the maximum output power of the power converter under a low-line input voltage with the heavy load.

Figure 4:
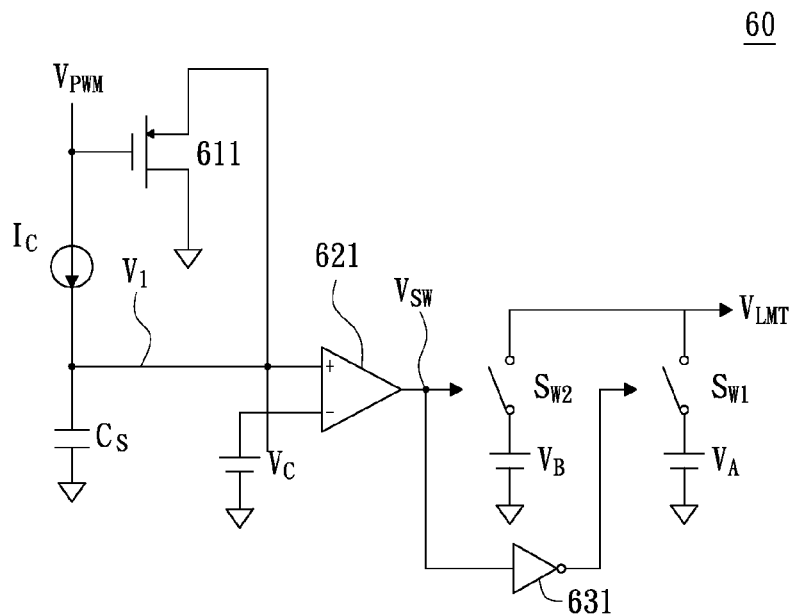
FIG. 4 illustrates one embodiment of the two-level limiter of the PWM controller in accordance with the present invention.

FIG. 4 is a circuitry block diagram of the two-level limiter 60 in accordance with one embodiment of the present invention. In the embodiment, the two-level limiter 60 comprises a comparing circuit and a two-level compensation circuit. A saw-tooth circuit and a third comparator 621 develop the comparing circuit. The comparing circuit is coupled to the control circuit 70 for generating a switching signal $V_{SW}$ in response to the PWM signal $V_{PWM}$. The saw-tooth circuit comprises a current source $I_C$, a transistor 611, and a capacitor $C_S$. The current source $I_C$ is coupled between the control circuit 70 and the capacitor $C_S$. A drain of the transistor 611 is coupled to a ground. A source of the transistor 611 is coupled to the capacitor $C_S$. A gate of the transistor 611 is controlled by the PWM signal $V_{PWM}$ of the control circuit 70. The saw-tooth circuit is coupled to the control circuit 70 for generating a saw-tooth signal $V_1$ at the capacitor $C_S$ in response to an on/off status of the PWM signal $V_{PWM}$. The current source $I_C$ and the transistor 611 are controlled by the PWM signal $V_{PWM}$. As the PWM signal $V_{PWM}$ becomes logic-high, the transistor 611 is turned off and the current source $I_C$ is coupled to charge the capacitor $C_S$, the saw-tooth signal $V_1$ increases accordingly. The saw-tooth signal $V_1$ at the capacitor $C_S$ will be discharged in accordance with the PWM signal $V_{PWM}$ becomes logic-low and the transistor 611 is turned on.

A positive input of the third comparator 621 is coupled to the capacitor $C_S$ for receiving the saw-tooth signal $V_1$ of the saw-tooth circuit. A negative input of the third comparator 621 is supplied with a reference signal $V_C$. The third comparator 621 generates the switching signal $V_{SW}$ for comparing the saw-tooth signal $V_1$ with the reference signal $V_C$. When the reference signal $V_C$ is determined, the switching signal $V_{SW}$ will be generated in accordance with an amplitude of the saw-tooth signal $V_1$. The reference signal $V_C$ determines a holding period of the first-level signal $V_A$, and the holding period is to solve an over-compensation problem under the high-line input voltage with the heavy-load condition.

In the embodiment, a first switch $S_{W1}$, a second switch $S_{W2}$, an inverter 631, a first-level signal $V_A$ and a second-level signal $V_B$ develop the two-level compensation circuit. The two-level compensation circuit is coupled to the comparing circuit for generating the two-level limit signal $V_{LMT}$ in response to the on-time of the switching signal $V_{SW}$. The first switch $S_{W1}$ is coupled between the control circuit 70 (as shown in FIG. 3) and the first-level signal $V_A$. A control terminal of the first switch $S_{W2}$ is coupled to the output of the third comparator 621 of the comparing circuit through the inverter 631 to receive the switching signal $V_{SW}$. The second switch $S_{W2}$ is coupled between the control circuit 70 and the second-level signal $V_B$. A control terminal of the first switch $S_{W1}$ is coupled to the output of the third comparator 621 of the comparing circuit to receive the switching signal $V_{SW}$. Therefore, the first switch $S_{W1}$ and the second switch $S_{W2}$ are controlled by an on/off status of the switching signal $V_{SW}$, respectively. The two-level limit signal $V_{LMT}$ is formed by the first-level signal $V_A$ and the second-level signal $V_B$ during the switching period $T_S$ of the PWM signal $V_{PWM}$. The first-level signal $V_A$ is outputted when the switching signal $V_{SW}$ becomes logic-low and the first switch $S_{W1}$ is turned on. In addition, the second-level signal $V_B$ is outputted when the switching signal $V_{SW}$ becomes logic-high and the second switch $S_{W2}$ is turned on. The first-level signal $V_A$ is higher than the second-level signal $V_B$.

Figure 5A:
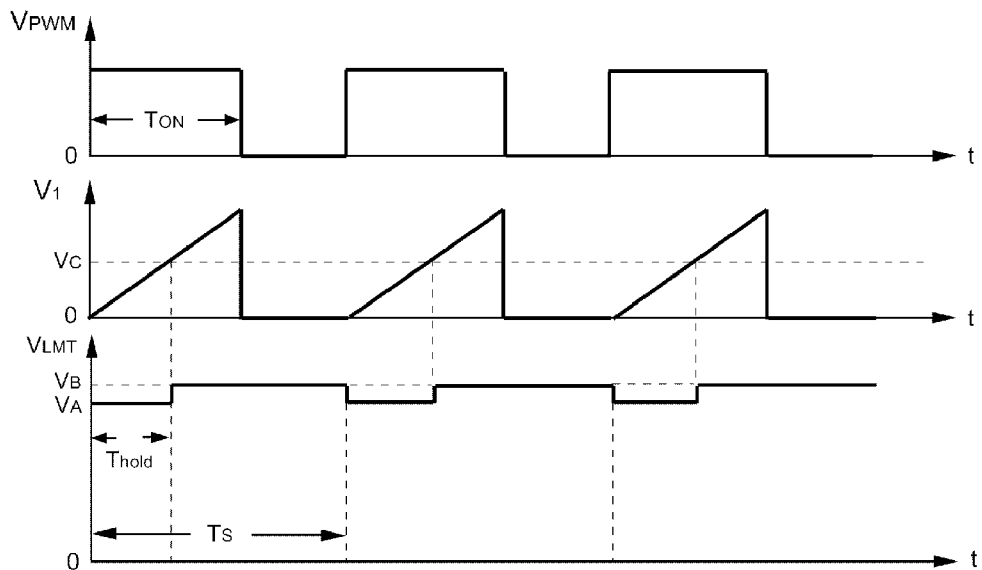
FIG. 5A shows the signal waveforms of the PWM controller in accordance with the present invention.

FIG. 5A shows the signal waveforms of the PWM controller in accordance with the present invention. Referring to FIG. 4, when the PWM signal $V_{PWM}$ becomes logic-high, the current source $I_C$ is coupled to charge the capacitor $C_S$, the saw-tooth signal $V_1$ increases accordingly. When the saw-tooth signal $V_1$ increases but is lower than the reference signal $V_C$, the switching signal $V_{SW}$ produced by the output of the comparator 621 is logic-low. The control terminal of the first switch $S_{W1}$ is logic-high through the inverter 631. The two-level limit signal $V_{LMT}$ generates the first-level signal $V_A$ in response to the first switch $S_{W1}$ is turned on. When the saw-tooth signal $V_1$ still increases and is higher than the reference signal $V_C$, the switching signal $V_{SW}$ produced by the output of the comparator 621 is logic-high. The two-level limit signal $V_{LMT}$ generates the second-level signal $V_B$ in response to the second switch $S_{W2}$ is turned on. The two-level limit signal $V_{LMT}$ is formed by the first-level signal $V_A$ and the second-level signal $V_B$ during the switching period $T_S$ of the PWM signal $V_{PWM}$. The saw-tooth signal $V_1$ at the capacitor $C_S$ will be discharged in accordance with the PWM signal $V_{PWM}$ becomes logic-low and the transistor 611 is turned on. The reference signal $V_C$ determines the holding period $T_{hold}$ of the first-level signal $V_A$, and the holding period $T_{hold}$ is to solve the over-compensation problem under the high-line input voltage with the heavy-load condition.

Figure 5B:
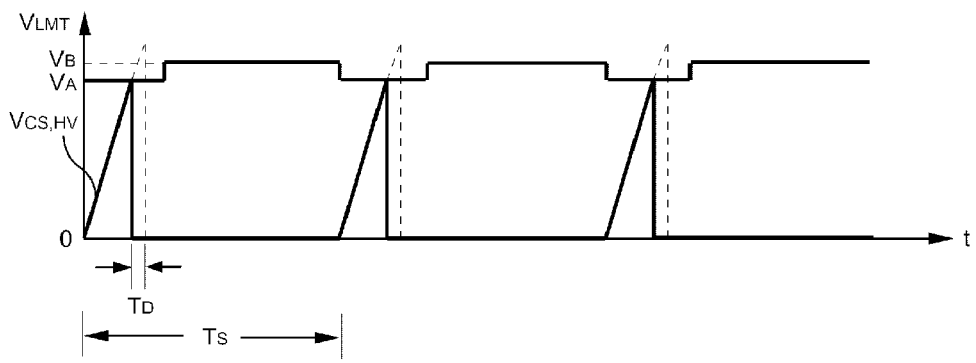
FIG. 5B illustrates the signal waveforms of the two-level limit signal and the current signal of the PWM controller under the high-line input voltage with the heavy-load condition in accordance with the present invention.

FIG. 5B illustrates the signal waveforms of the two-level limit signal and the current signal of the PWM controller under the high-line input voltage with the heavy-load condition in accordance with the present invention. The two-level limit signal $V_{LMT}$ comprises the first-level signal $V_A$ and the second-level signal $V_B$ during the switching period $T_S$ of the PWM signal $V_{PWM}$. The first-level signal $V_A$ is lower than the second-level signal $V_B$. If the current signal $V_{CS,HV}$ of the PWM controller under the high-line input voltage with the heavy-load condition is greater than the first-level signal $V_A$ of the two-level limit signal $V_{LMT}$ through the first comparator 31 (as shown in FIG. 3), the PWM controller is cycle-by-cycle to disable the PWM signal $V_{PWM}$. In other words, the lower of the two-level limit signal $V_{LMT}$ is to limit the on-time $T_{ON}$ of the PWM signal $V_{PWM}$ and the primary-side switching current $I_P$, and it also restricts the maximum output power of the power converter.

Figure 5C:
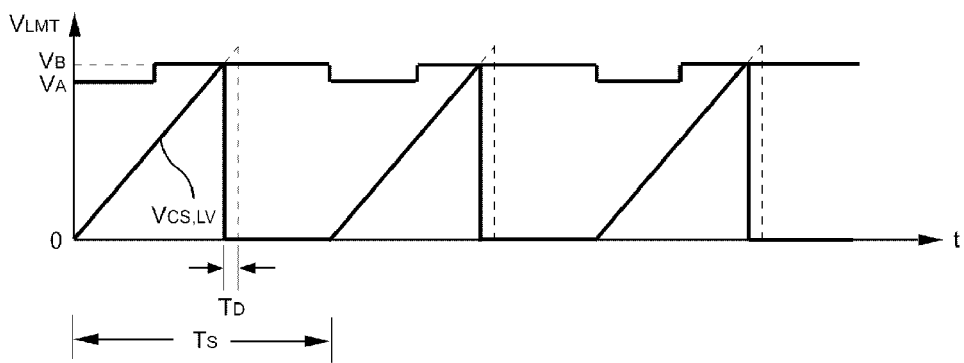
FIG. 5C illustrates the signal waveforms of the two-level limit signal and the current signal of the PWM controller under the low-line input voltage with the heavy-load condition in accordance with the present invention.

FIG. 5C illustrates the signal waveforms of the two-level limit signal and the current signal of the PWM controller under the low-line input voltage with the heavy-load condition in accordance with the present invention. The second-level signal $V_B$ is higher than the first-level signal $V_A$. If the current signal $V_{CS,LV}$ is greater than the second-level signal $V_B$ of the two-level limit signal $V_{LMT}$ through the first comparator 31 (as shown in FIG. 3), the PWM controller is cycle-by-cycle to disable the PWM signal $V_{PWM}$. In other words, the higher of the two-level limit signal $V_{LMT}$ is to achieve an under-voltage (brownout) protection for the AC line voltage. Therefore, the two-level limiter of the PWM controller can compensate the difference caused by the input voltage and the delay time, an identical maximum output power for the low-line and high-line input voltage can be achieved.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims

What is claimed is:

1. A PWM controller for compensating a maximum output power of a power converter, comprising:
   an oscillator, for generating a pulse signal;
   a control circuit, coupled to the oscillator for generating a PWM signal in response to the pulse signal, wherein the PWM signal controls a power switch; and
   a two-level limiter, coupled to the control circuit for generating a two-level limit signal in response to an on-time of the PWM signal, wherein the two-level limit signal is formed by a first-level signal and a second-level signal during a switching period of the PWM signal, and the first-level signal is used to limit the maximum output power of the power converter under a high-line input voltage with a heavy-load condition, and the second-level signal is used to limit the maximum output power of the power converter under a low-line input voltage with the heavy-load condition.

2. The PWM controller of claim 1, wherein the two-level limiter comprises:
   a comparing circuit, coupled to the control circuit for generating a switching signal in response to the PWM signal; and
   a two-level compensation circuit, coupled to the comparing circuit for generating the two-level limit signal in response to the switching signal,
   wherein the first-level signal is generated in response to the switching signal is logic-low, the second level signal is generated in response to the switching signal is logic-high.

3. The PWM controller of claim 2, wherein the comparing circuit comprises:
   a saw-tooth circuit, coupled to the control circuit for generating a saw-tooth signal in response to an on/off status of the PWM signal; and
   a comparator, coupled to the saw-tooth circuit for comparing the saw-tooth signal with a reference signal to generate the switching signal.

4. A PWM controller for compensating a maximum output power of a power converter, comprising:
   an oscillator, for generating a pulse signal;
   a control circuit, coupled to the oscillator for generating a PWM signal in response to the pulse signal, wherein the PWM signal controls a power switch; and
   a two-level limiter, coupled to the control circuit for generating a two-level limit signal in response to an on-time of the PWM signal, wherein the two-level limit signal is formed by a first-level signal and a second-level signal during a switching period of the PWM signal, and the first-level signal is used to limit the maximum output power of the power converter under a high-line input voltage with a heavy-load condition, and the second-level signal is used to limit the maximum output power of the power converter under a low-line input voltage with the heavy-load condition;
   wherein the two-level limiter comprises:
   a comparing circuit, coupled to the control circuit for generating a switching signal in response to the PWM signal; and a two-level compensation circuit, coupled to the comparing circuit for generating the two-level limit signal in response to the switching signal; wherein the first-level signal is generated in response to the switching signal is logic-low, the second level signal is generated in response to the switching signal is logic-high;

wherein the comparing circuit comprises:
a saw-tooth circuit, coupled to the control circuit for generating a saw-tooth signal in response to an on/off status of the PWM signal; and
a comparator, coupled to the saw-tooth circuit for comparing the saw-tooth signal with a reference signal to generate the switching signal;
wherein the reference signal determines a holding period of the first-level signal, and the holding period is to solve an over-compensation problem under the high-line input voltage with the heavy-load condition.

5. A method for compensating a maximum output power of a power converter, comprising the steps of:

generating a pulse signal;
generating a PWM signal in accordance with the pulse signal, wherein the PWM signal controls a power switch; and
generating a two-level limit signal in accordance with an on-time of the PWM signal, wherein the two-level limit signal is formed by a first-level signal and a second-level signal during a switching period of the PWM signal.

6. The method of claim 5, wherein the first-level signal is used to limit the maximum output power of the power converter under a high-line input voltage with a heavy-load condition.

7. The method of claim 5, wherein the second-level signal is used to limit the maximum output power of the power converter under a low-line input voltage with a heavy-load condition.

* * * * *